US011472356B2

(12) United States Patent
Murray et al.

(10) Patent No.: US 11,472,356 B2
(45) Date of Patent: Oct. 18, 2022

(54) VEHICLE PARKED MODE CONTROL

(71) Applicant: Ford Global Technologies, LLC, Dearborn, MI (US)

(72) Inventors: Andrew John Murray, Colchester (GB); Ian Sutherland Wright, Chelmsford (GB); Torsten Gerhardt, London (GB); Christopher Wright, Somerville, MA (US); Daniel Tauber, Edling (DE)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 16/577,989

(22) Filed: Sep. 20, 2019

(65) Prior Publication Data

US 2020/0094757 A1    Mar. 26, 2020

(30) Foreign Application Priority Data

Sep. 26, 2018 (GB) ..................... 1815703
Apr. 25, 2019 (GB) ..................... 1905757

(51) Int. Cl.
*B60R 16/03*     (2006.01)
*B60W 10/18*     (2012.01)
(Continued)

(52) U.S. Cl.
CPC ......... *B60R 16/03* (2013.01); *B60H 1/00778* (2013.01); *B60K 28/04* (2013.01);
(Continued)

(58) Field of Classification Search
CPC ......... B60R 16/03; B60R 25/31; B62D 1/183; B60K 28/04; B60W 30/18054;
(Continued)

(56) References Cited

U.S. PATENT DOCUMENTS

2005/0017855 A1    1/2005   Harvey
2007/0203618 A1    8/2007   McBride et al.
(Continued)

FOREIGN PATENT DOCUMENTS

DE     102005021041 A1    11/2006
DE     102007039470 A1     2/2009
(Continued)

OTHER PUBLICATIONS

Nissan USA, "2014 Altima Sedan Owner's manual", Jun. 2013 (Year: 2013).*
(Continued)

*Primary Examiner* — James M McPherson
*Assistant Examiner* — Kyle J Kingsland
(74) *Attorney, Agent, or Firm* — Frank A. MacKenzie; Bejin Bieneman PLC

(57) ABSTRACT

A vehicle control system for a vehicle, the vehicle control system comprising a controller, wherein the controller has an activatable secondary parked mode in which the controller automatically controls a plurality of components of the vehicle, each component also being controllable by a corresponding user control, and activation of the secondary parked mode changes the state of each component from an in-use state to a parked state when the vehicle attends a delivery or collection.

17 Claims, 4 Drawing Sheets

(51) Int. Cl.
  *B60H 1/00* (2006.01)
  *B60W 10/06* (2006.01)
  *B60W 10/20* (2006.01)
  *B60R 25/31* (2013.01)
  *B62D 1/183* (2006.01)
  *B60K 28/04* (2006.01)
  *B60W 30/18* (2012.01)

(52) U.S. Cl.
  CPC ............ *B60R 25/31* (2013.01); *B60W 10/06* (2013.01); *B60W 10/182* (2013.01); *B60W 10/20* (2013.01); *B60W 30/18054* (2013.01); *B62D 1/183* (2013.01)

(58) Field of Classification Search
  CPC .... B60W 10/06; B60W 10/182; B60W 10/20; B60H 1/00778
  See application file for complete search history.

(56) References Cited

U.S. PATENT DOCUMENTS

2010/0181827 A1  7/2010  Cunningham et al.
  2013/0066525 A1  3/2013  Tomik et al.
  2014/0077931 A1* 3/2014  Cho ..................... B60R 25/245
                                                                340/5.72
  2015/0088404 A1  3/2015  Geissenhoener
  2016/0264097 A1* 9/2016  Oesterling ............. B60R 25/20
  2017/0267244 A1  9/2017  Kim
  2018/0154793 A1  6/2018  Jun et al.

FOREIGN PATENT DOCUMENTS

DE    102013003058 A1   8/2014
  EP         1820700 A2   8/2007
  GB         2550011 A   11/2017
  GB         2564195 A    1/2019
  WO      2018185053 A1  10/2018

OTHER PUBLICATIONS

PR Newswire, "Apple Watch Car Starter and Vehicle Management App Announced byConnect2Car", Oct. 20, 2015 (Year: 2015).*
Extended European Search Report from EPO dated Feb. 25, 2020 regarding Application No. EP19196828.8 (6 pages).
Combined Search and Examination Report dated Mar. 26, 2019 regarding Application No. GB1815703.2 (7 pages).

* cited by examiner

VEHICLE PARKED MODE CONTROL

CROSS-REFERENCE TO RELATED APPLICATIONS

This application claims priority to United Kingdom Application No. GB 1815703.2, filed on Sep. 26, 2018 and United Kingdom Application No. GB 1905757.9, filed Apr. 25, 2019, which applications are hereby incorporated herein by reference in their entirety.

TECHNICAL FIELD

This disclosure relates generally to a vehicle control system and method for a vehicle with a secondary parked mode in which a plurality of components of the vehicle are controlled.

BACKGROUND

Delivery drivers may do a hundred or more deliveries in a particular day, and for each of those deliveries, they may repeat certain procedures when they are parking the vehicle and setting off again. Reducing the burden on the delivery driver during these procedures can save a significant amount of time and effort over the course of a day.

SUMMARY

According to an aspect of the present disclosure, there is provided a vehicle control system for a vehicle, such as a motor vehicle (e.g., a commercial motor vehicle). The vehicle control system includes a controller. The controller has an activatable secondary (e.g., temporary, short-stop or delivery/collection) parked mode in which the controller automatically controls a plurality of components of the vehicle, and activation of the secondary parked mode changes the state of each component from an in-use state to a parked state when the vehicle is parked, e.g., when the vehicle attends a delivery or collection.

The secondary parked mode may correspond to a delivery mode, which may, for example, be deployed when the vehicle attends a delivery or collection. A driver of the vehicle may leave the vehicle when in the secondary parked mode.

Each component may also be controllable by a corresponding user control. Without the secondary parked mode, each of the user controls may otherwise require separate driver interactions to change the components into the parked state. The components of the vehicle may be substantially unrelated from one another and as such may relate to separate components of the vehicle. The secondary parked mode may control a selection of vehicle components that would otherwise require a user to set and re-set a plurality of controls if the secondary park mode was not present. The secondary parked mode may pause the state of one or more of the vehicle components and the components may resume their previous function when the secondary parked mode is terminated. One or more of the vehicle components may enter a low power mode when in the secondary parked mode.

The controller may determine when the vehicle is stopping temporarily, such as during a delivery or collection. The controller may determine when the vehicle is stopping temporarily automatically or via a manual interaction. In the latter case the controller may determine if the vehicle is stopping temporarily via a user interface device that the driver may activate.

The controller may be configured to automatically activate the secondary parked mode when the vehicle is parked, e.g., attends a delivery or collection. The controller may receive vehicle position data. The controller may compare said vehicle position data to one or more predetermined destinations of the vehicle, e.g., from a schedule of delivery or collection stops. The controller may be further configured to activate the secondary parked mode if it is determined that the vehicle has parked or stopped within a distance of one or more of the predetermined destinations. The distance may depend on the location of the predetermined destination. The distance may depend on the level of urbanization at the predetermined destination, for example, whether the destination is an urban, suburban, or rural area. The urbanization categorization of destinations may be predetermined.

The secondary parked mode may be manually activated by virtue of a user interface device, such as a switch, button, touchscreen, dial, knob, or any other type of input device.

The user interface device may be linked to a particular component of the vehicle. An input to the user interface device may control the particular component and activate the secondary parked mode. For example, the secondary parked mode may be activated when a seat belt is de-latched, when a parking brake is activated, when an engine start-stop button is pressed, or any other vehicle component is controlled. The user interface device may comprise a primary portion that controls only the particular component. The user interface device may comprise a secondary portion that both controls the particular component and activates the secondary parked mode. For example, a secondary button may be provided on or next to a primary button and activation of the secondary button may activate both the particular component and the secondary parked mode, whereas activation of the primary button may activate only the particular component. The secondary button may activate the secondary parked mode. Such an arrangement may be provided for an engine start-stop button, an electronic parking brake button, or any other button.

The user interface device may be a dedicated secondary parked mode user interface device.

The user interface device may be integral with, e.g., permanently attached within, the vehicle. Alternatively, the user interface device may be separable from the vehicle, e.g., by the user. For example, the user interface device may be a wearable device.

The user interface device may communicate with the controller wirelessly, e.g., via Bluetooth®, Wi-Fi®, or any other wireless protocol.

The secondary parked mode may be pre-activated based on a user input. The secondary parked mode may be subsequently activated once the vehicle stops. The secondary parked mode may be pre-activated based on one of a first user input and a second user input. The first and second user inputs may be associated with left and right hand sides of the vehicle, respectively. One or more of the plurality of vehicle components may be changed to a left parked state or a right parked state when the vehicle is parked (e.g., attends a delivery or collection) based on which of the first or second user inputs has been selected. For example, the left or right indicator lights may be activated by the secondary parked mode based on which of the first or second user inputs has been selected.

The controller may be configured to return each of the components to their respective previous in-use states upon termination of the secondary parked mode.

Termination of the secondary parked mode may be automatic. The secondary parked mode may automatically terminate when a driver returns to the vehicle, e.g., with the intention of driving the vehicle. For example, the secondary parked mode may terminate when the doors are unlocked (e.g., via a key-fob or keyless entry), when a door is opened (such as the driver's door), or any other action upon re-entry to the vehicle. By way of further example, the secondary parked mode may terminate when it is sensed that a driver's seat is occupied, a driver's seat belt is engaged in its socket, the vehicle is started, or any other termination event is sensed or combinations thereof.

Components, e.g., systems, of the vehicle may be paused while the vehicle is in the secondary parked mode. The components may be in a low power state when the secondary parked mode is activated. The secondary parked mode may remain activated when a driver or other occupant returns to the vehicle, e.g., without the intention of driving the vehicle. For example, the driver or other occupant may return to the vehicle and unlock the vehicle without necessarily terminating the secondary parked mode. The secondary parked mode may then be terminated upon detection of a termination event. For example, the termination event may comprise sensing a presence of an occupant in a driver's seat, the driver's door is opened, driver's seat belt engaged, or any other termination event or combination thereof. Not automatically terminating the secondary parked mode when a driver returns to the vehicle may preserve battery life as vehicle components may remain in a low power mode, for example, in scenarios when a driver may temporarily return to the vehicle, e.g., to simply collect or return items without intending to drive the vehicle.

The secondary parked mode may be terminated manually, e.g., via the above-mentioned user interface device or another user interface device, such as a dedicated button on the key-fob. The secondary parked mode may be terminated manually, e.g., if an automatic termination has yet or failed to occur.

The secondary parked mode may be configurable so as to: select a different plurality of components of the vehicle to be changed by the controller when the secondary parked mode is activated; change the nature of the parked state for particular components; and/or change how the components change when the secondary parked mode is terminated. The secondary parked mode may be configurable by a driver or by a fleet manager.

The controller may collect data about driver interactions with the components of the vehicle when parked, e.g., during a delivery or collection stop. The controller may send such collected data to a central server. The data may be accessed by a fleet manager. The secondary parked mode may be configured by the fleet manager to best suit the drivers or a particular driver working on a fleet of vehicles. The secondary parked mode for a particular vehicle may be changed to suit a particular driver.

The controller may have a primary (e.g., non-temporary or full) parked mode, e.g., in which components of the vehicle are in a parked state. The primary parked mode may be intended for longer stops than the secondary parked mode. In the secondary parked mode, a different set of components of the vehicle may be changed from the in-use state to the parked state than in the primary parked mode. In the secondary parked mode, the parked state for a particular component of the vehicle may be different from the parked state in the primary parked mode. The components of the vehicle may be returned to their in-use states when the secondary parked mode is terminated, and one or more of the components may not be returned to their in-use states when the primary parked mode is terminated.

The secondary park mode may control one or more of the vehicle components in a logic sequence of interdependent states or conditions to facilitate a pre-programmed repeated (e.g., choreographed) user interaction with the vehicle.

A vehicle may comprise the aforementioned vehicle control system.

According to another aspect of the present disclosure, there is provided a user interface device for a vehicle control system of a vehicle. The vehicle control system comprising a controller, wherein the controller has an activatable secondary parked mode in which the controller automatically controls a plurality of components of the vehicle, and activation of the secondary parked mode changes the state of each component from an in-use state to a parked state when the vehicle is parked, e.g., attends a delivery or collection. The user interface device is configured to communicate with the controller to activate the secondary parked mode.

The user interface device may be separable from the vehicle, e.g., by the user. The user interface device may be a wearable device. The user interface device may communicate with the controller wirelessly.

According to another aspect of the present disclosure, there is provided a method for controlling a plurality of components of a vehicle, the method comprising:

activating a secondary parked mode in which a controller automatically controls the plurality of components of the vehicle, and changing the state of each component from an in-use state to a parked state when the vehicle is parked, e.g., attends a delivery or collection.

The method may further implement any of the features described above.

There may be provided a non-transitory computer readable medium comprising instructions which, when executed by a processor, cause performance of the above-described method.

Exemplary components of the vehicle include (and are not limited to): the engine or power source, a locking system for the vehicle, parking brakes, windows, wing mirrors, sound system (such as a radio), cargo door release mechanisms, hazard lights, head lights, side lights, indicator lights, wipers, visual displays (inside or outside vehicle), seatbelt latches, alarm system, climate controls, steering wheel and/or any other component systems of the vehicle. Accordingly, by way of example, the secondary parked mode may change the components to be in the parked state in which: the engine or power source may be turned off, the locking system may lock the doors, the parking brakes may be applied, the windows may be closed, the wing mirrors may be folded, the sound system may be turned off, the cargo door release mechanisms may open a cargo door (and prime it to be locked once closed), the hazard lights may be activated, the head lights and side lights may be turned off, the appropriate indicator lights may be activated, the wipers may be turned off, visual displays (inside or outside vehicle) may be turned on or off as required, the seatbelt latches may release the seat belt, the alarm system may be activated, a climate control system may be deactivated (or kept running when in secondary parked mode), a steering wheel may be moved or reconfigured (e.g., about an axis perpendicular to a steering axis) to create more space for the driver and/or any other component systems of the vehicle may be changed to an appropriate state for when the vehicle is parked. Any subset of the features mentioned above may be controlled by the secondary parked mode.

According to an aspect of the present disclosure, there is provided a vehicle control system for a vehicle, such as a motor vehicle (e.g., a commercial motor vehicle). The vehicle control system includes a controller. The controller has an activatable parked mode in which the controller automatically controls a plurality of components of the vehicle, and activation of the parked mode changes the state of each component from an in-use state to a parked state when the vehicle is parked. The parked mode may remain activated when a driver or other occupant returns to the vehicle, e.g., without the intention of driving the vehicle. For example, the driver or other occupant may return to the vehicle and unlock the vehicle without necessarily terminating the parked mode such that one or more of the plurality of components of the vehicle remain in the parked state. The parked mode may then be terminated upon detection of a termination event, e.g., distinct from unlocking the vehicle. By way of example, the termination event may comprise sensing a presence of an occupant in a driver's seat, the driver's door is opened, driver's seat belt engaged or any other termination event or combination thereof. A corresponding method may be provided.

To avoid unnecessary duplication of effort and repetition of text in the specification, certain features are described in relation to only one or several aspects or embodiments. However, it is to be understood that, where it is technically possible, features described in relation to any aspect or embodiment may also be used with any other aspect or embodiment.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
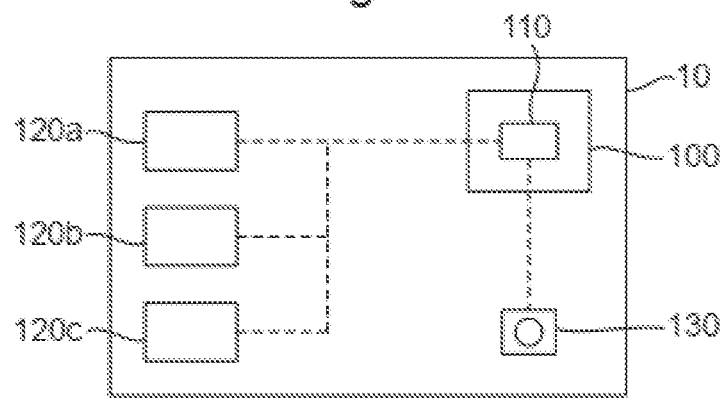
FIG. 1 is a schematic diagram depicting a vehicle control system for a vehicle according to a first arrangement of the present disclosure.

With reference to FIG. 1, the present disclosure relates to a vehicle control system 100 for a vehicle 10, such as a motor vehicle and in particular a commercial motor vehicle for use in multi-stop logistics. A driver of the vehicle 10 may attend multiple delivery or collection stops during a particular working shift.

The vehicle control system 100 comprises a controller 110 that is configured to control a plurality of components 120a, 120b, 120c of the vehicle. The components 120a-c of the vehicle may relate to separate components of the vehicle. Each component may also be independently controllable by respective user controls (not shown) requiring individual driver interactions. Exemplary components of the vehicle include (and are not limited to): the engine or power source, a locking system for the vehicle, parking brakes, windows, wing mirrors, sound system (such as a radio), cargo door release mechanisms, hazard lights, head lights, side lights, indicator lights, wipers, visual displays (inside or outside the vehicle), seatbelt latches, alarm system, climate controls, steering wheel and/or any other component systems of the vehicle.

The controller 110 has an activatable secondary parked, or delivery, mode in which the controller automatically controls the plurality of components 120a-c of the vehicle. Activation of the delivery mode changes the state of each component 120a-c from an "in-use" state to a "parked" state when the vehicle 10 is parked, e.g., attends a delivery or collection. (The state of one or more of the components 120a-c may change from the "in-use" state to the "parked" state in a logic sequence of interdependent states or conditions.) The control system 100 may store the position or value of the in-use state for one or more of the components 120a-c so that they may be returned to their original states. The "parked" state may correspond to an "off", paused, low energy and/or intermediate state, or the "parked" state may correspond to the original in-use state. Some components may normally be turned off when a vehicle is stopped, but in the case of a delivery mode event it may be desirable to keep certain components functioning (such as climate control systems) in the knowledge that the stop will be for a relatively short period of time.

For example, the delivery mode may change the components 120a-c to be in the parked state in which: the engine or power source may be turned off, the locking system may lock the doors (e.g., cab locks may be automatically locked once the driver has exited the cab and/or cargo door locks may be activated once a cargo door is closed), the parking brakes may be applied, the windows may be closed, the wing mirrors may be folded (e.g., once the doors have been closed to retain rear view until driver has exited the cab), the sound system may be turned off, the cargo door release mechanisms may open a cargo door (and prime it to be locked once closed), the hazard lights may be activated, the head lights and side lights may be turned off, the appropriate indicator lights may be activated, the wipers may be turned off, visual displays (inside or outside the vehicle) may be turned on or off as required, the seatbelt latches may release the seat belt, the alarm system may be activated, a climate control system may be deactivated (or kept running), a steering wheel may be moved or reconfigured (e.g., about an axis perpendicular to a steering axis) to create more space for the driver, and/or any other component systems of the vehicle may be changed to an appropriate state for when the vehicle is parked. Any subset of the features mentioned above may be controlled by the delivery mode. The delivery mode reduces the number of separate driver interactions with the user controls for each component 120a-c that would have otherwise been required, which saves time and reduces the strain on the delivery driver.

As mentioned above, the secondary park mode may control one or more of the vehicle components in a logic sequence of interdependent states or conditions to facilitate a pre-programmed repeated (e.g., choreographed) user interaction with the vehicle. For example, the secondary park mode may trigger a sequence of events in which the wing mirrors may fold after the driver has opened and closed their door, so that the driver can still view the traffic during egress.

The delivery mode may be manually activated by virtue of a user interface device 130, such as a switch, button, touchscreen, dial, knob, or any other type of input device. The user interface device 130 may be a dedicated delivery mode user interface device. The driver may activate the delivery mode when the vehicle 10 stops prior to performing a delivery or collection. Activating the delivery mode via the user interface device 130 saves the driver from having to manually interface with the user controls for each of the vehicle components 120a-c.

Figure 2:
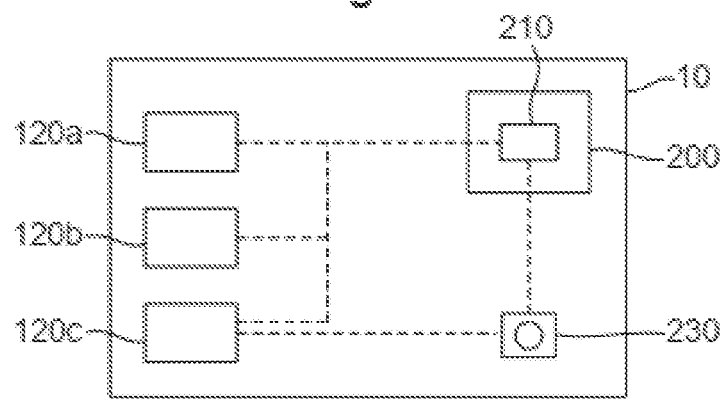
FIG. 2 is a schematic diagram depicting a vehicle control system for a vehicle according to a second arrangement of the present disclosure.

With reference to FIG. 2, a user interface device 230 may instead also be linked to a particular component 120c of the vehicle 10 as well as controller 210 of control system 200. An input to the user interface device 230 may control the particular component 120c and activate the delivery mode. For example, the delivery mode may be activated when a seat belt is de-latched, a parking brake is activated, an engine start-stop button is pressed, or any other vehicle component is controlled as the vehicle 10 is parked. In this way, the number of user controls may be reduced since a dedicated user interface device for the delivery mode is not required.

Figure 3A:
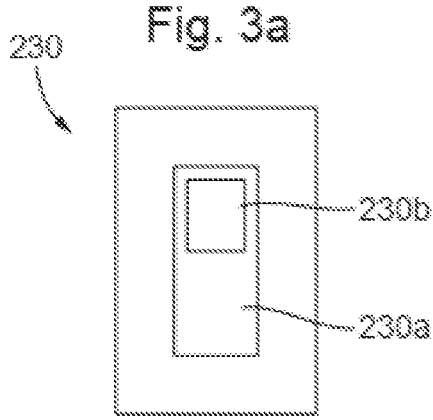
FIGS. 3a and 3b are schematic diagrams depicting user interface devices according to arrangements of the present disclosure.
Figure 3B:
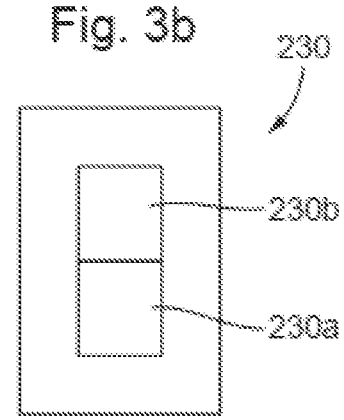

With reference to FIGS. 3a and 3b, the user interface device 230 may comprise a primary portion 230a that controls only the particular component 120c. The user interface device 230 may further comprise a secondary portion 230b that both controls the particular component 120c and activates the delivery mode. In the example depicted in FIG. 3a, the secondary portion 230b is provided on the primary portion 230a such that activation (e.g., depression) of the secondary portion 230b activates both the primary and secondary portions 230a, 230b. In effect, a force applied to the secondary portion 230b by the driver is also translated to the primary portion 230a. By contrast, direct activation of the primary portion 230a may activate only the particular component 120c. Alternatively, as shown in FIG. 3b, the secondary portion 230b is provided next to the primary portion 230a. In either example, the primary and secondary portions 230a, 230b of the user interface device 230 may be appropriately labelled so that the driver can determine which portion 230a, 230b to press depending on whether delivery mode is desirable or not. Such arrangements may be provided for an engine start-stop button, an electronic parking brake button, or any other user control.

The user interface device 130, 230 may be integral with, e.g., permanently attached within, the vehicle 10. Conversely, with reference to FIG. 4, a user interface device 430 may be separate from the vehicle 10. For example, the user interface device 430 may be a wearable device (or part of a wearable device) that may be attached to an item of clothing or apparel of the driver or worn directly, e.g., such as a bracelet. The user interface device 430 may comprise a clasp, clip, or other such securing means to attach the user interface device to a desired item. The user interface device 430 may or may not also comprise the vehicle key.

Although being separate from the vehicle 10, the user interface device 430 may nonetheless be attached to the vehicle 10, e.g., via a coupling, such as a hook and loop fastening system. The driver may then decide where to locate the user interface device 430 to best suit their requirements.

In a further example of the user interface device 430 being separate from the vehicle 10, the user interface device 430 may be provided on or as part of a logistics device. The logistics device may log consignments, scan delivery/collection items, provide delivery/collection scheduling information, receive signatures and/or any other logistics function.

Figure 4:
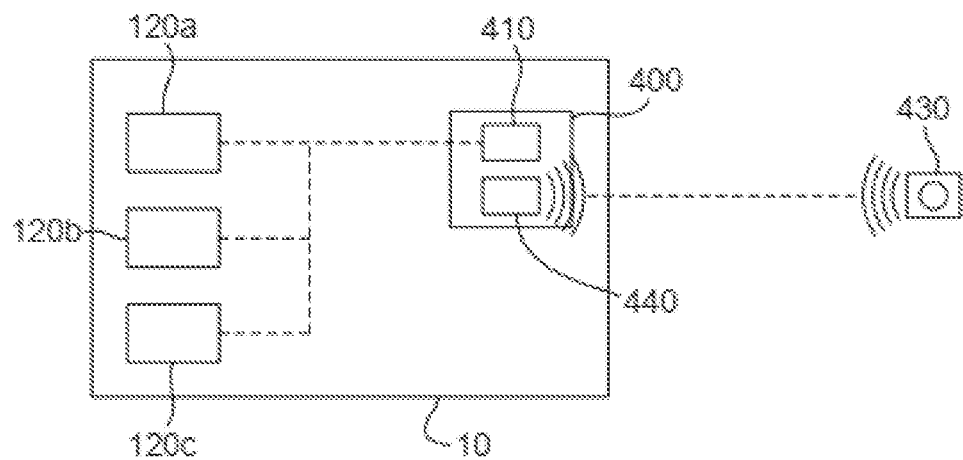
FIG. 4 is a schematic diagram depicting a vehicle control system for a vehicle according to a third arrangement of the present disclosure and a user interface device according to an arrangement of the present disclosure.

As depicted in FIG. 4, the user interface device 430 may communicate with the controller 410 wirelessly, e.g. via Bluetooth®, Wi-Fi® or any other wireless protocol. The vehicle control system 400 may comprise a wireless communication bus 440 configured to receive activation data from the user interface device 430 and send such data to the controller 110. The user interface device 430 may be paired with the wireless communication bus 440.

The delivery mode may be automatically activated when the vehicle 10 comes to a stop. However, the delivery mode may be pre-activated or primed based on a user input prior to stopping. The delivery mode may then be automatically activated once the vehicle 10 stops. Such pre-activation may help avoid a false positive activation of the delivery mode when the vehicle 10 comes to a stop.

Figure 5:
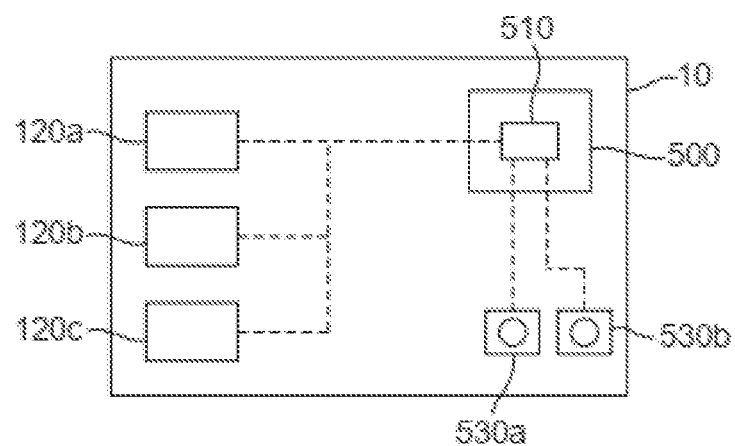
FIG. 5 is a schematic diagram depicting a vehicle control system for a vehicle according to a fourth arrangement of the present disclosure.

Referring to FIG. 5, the delivery mode may be pre-activated based on one of a first user input 530a or a second user input 530b, which communicate with controller 510 of control system 500. The first and second user inputs 530a, 530b may be associated with left and right hand sides of the vehicle 10, respectively. One or more of the plurality of vehicle components 120a-c may be changed to a left parked state or a right parked state when the vehicle 10 comes to a stop based on which of the first or second user inputs 530a, 530b has been selected. For example, the left or right indicator lights may be activated by the delivery mode based on which of the first or second user inputs 530a, 530b has been selected.

Figure 6:
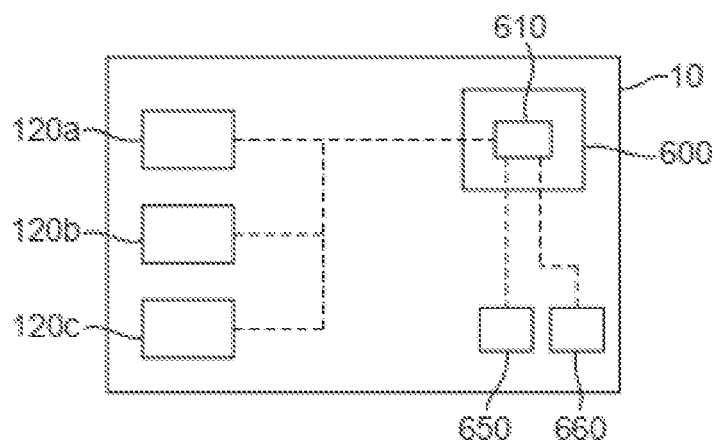
FIG. 6 is a schematic diagram depicting a vehicle control system for a vehicle according to a fifth arrangement of the present disclosure.

With reference to FIG. 6, controller 610 of control system 600 may be configured to automatically activate the delivery mode when the vehicle 10 attends a delivery or collection, for example, without necessarily requiring activation by the driver. The controller 610 may receive vehicle position data from a satellite navigation system 650. The controller 610 may compare said vehicle position data to one or more predetermined destinations of the vehicle 10, e.g., from a schedule of delivery or collection stops, which may be stored in a memory 660. The memory 660 may be part of the control system 600, the satellite navigation system 650, a logistics device or any other component. The controller 610 may be further configured to activate the delivery mode if it is determined that the vehicle 10 has parked or stopped within a certain distance or range of a predetermined destination, e.g., a scheduled stop. The distance may be a fixed distance or it may vary according to the location of the predetermined destination. In the latter case, the distance may depend on the level of urbanization at the predetermined destination, for example, if the destination is an urban area the distance may be greater than if the destination is in a rural area. In a rural area it may be more likely that the vehicle 10 will come to a stop and park closer to the destination, whereas in an urban area, the vehicle 10 may have to park a further distance away from the destination due to parking constraints. The satellite navigation system 650 or controller 610 may have stored upon it an urbanization categorization for each predetermined destination. Alternatively, the controller 610 may determine an urbanization level, for example, by calculating the density of residences (e.g., available addresses on the satellite navigation system 650) within a certain area around the predetermined destination.

The above-described controllers 110, 210, 410, 510, 610 may be configured to return each of the components 120a-c to their respective in-use states upon termination of the delivery mode. For example, the windows may return to their original positions, the radio may return to the original radio station, the climate controls may return to their original settings, the head/side lights may return to their original setting, the wipers may return to their original settings, etc.

Termination of the delivery mode may be automatic. For example, the delivery mode may automatically terminate when the driver returns to the vehicle 10. The delivery mode may terminate when the doors are unlocked (e.g., via a key-fob or keyless entry), when a door is opened (such as the driver's door), or any other action upon re-entry to the vehicle 10. Additionally, or alternatively, the secondary parked mode may terminate when it is sensed that a driver's seat is occupied (e.g., using a seat sensor), a driver's seat belt is engaged in its socket (e.g., using a seat belt sensor), the vehicle 10 is started, or any other termination event is sensed or combinations thereof.

As another example, the secondary parked mode may remain activated when a driver or other occupant returns to the vehicle 10 and unlocks the vehicle 10. The secondary parked mode may then be terminated upon detection of a different termination event or combination of events. For example, the termination event may comprise sensing a presence of an occupant in a driver's seat, the driver's door is opened, driver's seat belt engaged, or any other termination event or combination thereof. Not automatically terminating the secondary parked mode when a driver returns to the vehicle 10 may preserve battery life as vehicle components 120a-c may remain in a low power mode, for example, in scenarios when a driver may return to the vehicle 10 to simply collect or return items without intending to drive the vehicle 10.

As yet another example, the delivery mode may be terminated manually, e.g., via the above-mentioned user interface devices 130, 230, 430 or another user interface device, such as a dedicated button on the key-fob. Both the manual and automatic termination functionality may be provided. For example, the secondary parked mode may be terminated manually if an automatic termination has yet or failed to occur.

With any of the above-described arrangements, the delivery mode may be configurable so that a particular selection of components 120a-c may be selected to be controlled by the delivery mode. The delivery mode may be configured to add or remove certain components 120a-c from the delivery mode. For example, activation of the hazard lights may or may not be included in the delivery mode. The delivery mode may be configurable by the driver, e.g., from within the vehicle 10, or by a fleet manager, e.g. remotely. The delivery mode may, additionally or alternatively, be configurable to change the parked state for particular components 120a-c of the vehicle 10 (for example, whether the climate control system is kept on or not in the parked state). The delivery mode may, additionally or alternatively, be configurable to change how the components 120a-c change when the secondary parked mode is terminated, for example, whether they return to their in-use state or not.

Furthermore, with any of the above-described arrangements, the controller 110, 210, 410, 510, 610 may collect data about driver interactions with the components 120a-c of the vehicle 10 during a delivery or collection stop. The controller 110, 210, 410, 510, 610 may send such collected data to a central server. The data may be accessed by a fleet manager. Using this data, the delivery mode may then be configured by the fleet manager to best suit the drivers or a particular driver working on a fleet of vehicles. For example, the delivery mode for a particular vehicle 10 may be changed to suit a particular driver or the delivery mode for all of the vehicles in a fleet may be changed to best suit the needs of the fleet.

The controller 110, 210, 410, 510, 610 may additionally have a primary (e.g., non-temporary or full) parked mode, e.g., in which components 120a-c of the vehicle 10 are in a parked state. In the secondary parked mode, a different set of components 120a-c of the vehicle 10 may be changed from the in-use state to the parked state than in the primary parked mode. In the secondary parked mode, the parked state for a particular component 120a-c of the vehicle 10 may be different from the parked state in the primary parked mode. By way of example, some components 120a-c (such as a climate control system) may be kept on in the parked state in the secondary parked mode, whereas such components 120a-c may be turned off in the primary parked mode. In another example, some components 120a-c (such as cargo door locks) may be activated in a first manner (e.g., initially opened) in the secondary parked mode and in a second manner (e.g., closed) in the primary parked mode. The components 120a-c of the vehicle may be returned to their in-use states when the secondary parked mode is terminated, and one or more of the components 120a-c may not be returned to their in-use states when the primary parked mode is terminated. For example, the windows and/or lights (or other such components) of the vehicle may be returned to their in-use states when the secondary parked mode is terminated, whereas such components may not be returned to their in-use state when the primary parked mode is terminated.

Figure 7:
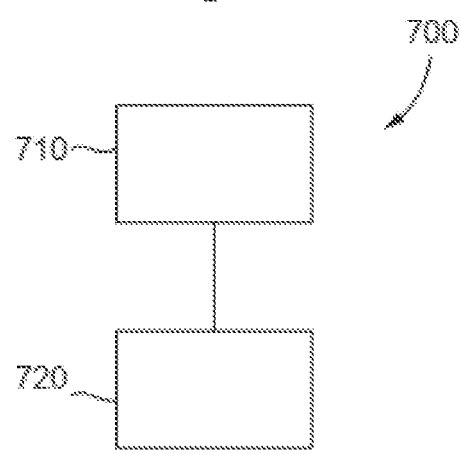
FIG. 7 is a flow chart depicting a method according to the present disclosure.

With reference to FIG. 7, the present disclosure relates to a method 700 for controlling the plurality of components 120a-c of the vehicle 10. The method comprises a first step 710 in which the delivery mode is activated. The controller 110 automatically controls the plurality of components 120a-c of the vehicle 10. In a second step 720, the state of each component 120a-c is changed from the in-use state to the parked state when the vehicle 10 attends a delivery or collection. The method 700 may further implement any of the features described above.

Figure 8A:
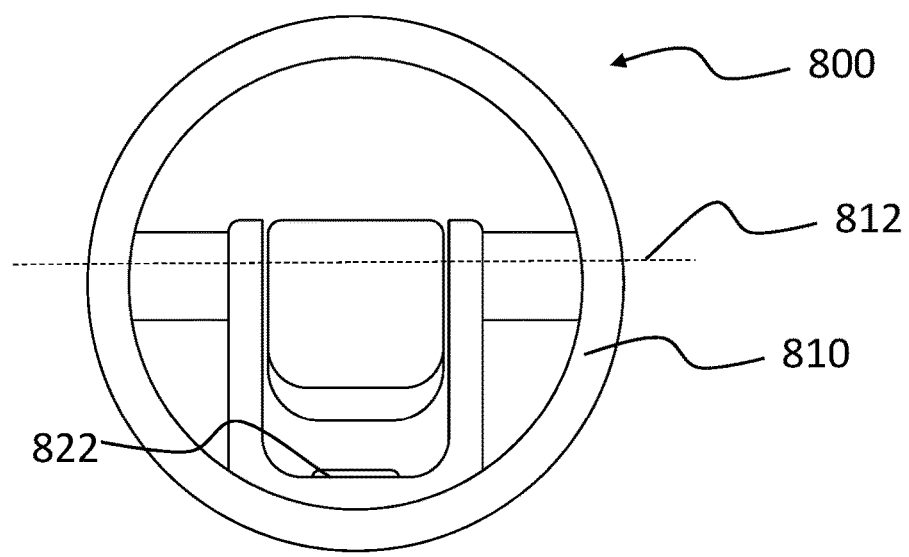
FIGS. 8a, 8b and 8c (collectively FIG. 8) depict an example of a steering wheel assembly for use with a vehicle control system of the present disclosure with FIG. 8a showing a front view of the steering wheel assembly and FIGS. 8b and 8c showing side views of the steering wheel assembly in an operable state and an egress assisting state respectively.
Figure 8B:
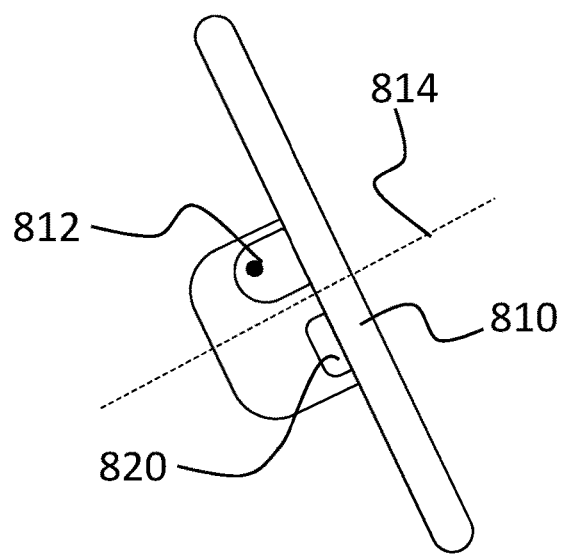
Figure 8C:
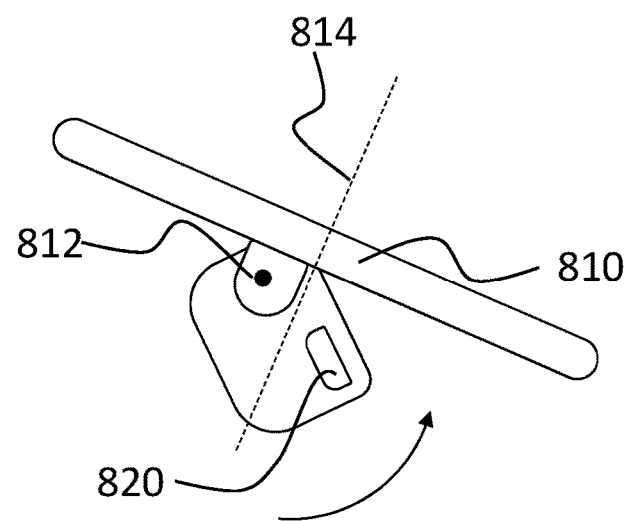

With reference to FIG. 8, one of the components 120a-c of the vehicle 10 may include a steering wheel assembly 800, which in turn includes a steering wheel 810. Any of the above-mentioned controllers 110, 210, 410, 510, 610 may control aspects of the steering wheel assembly 800. For example, the controller 110, 210, 410, 510, 610 may return the steering wheel 810 (and thus the wheels of the vehicle 10 controlled by the steering wheel 810) to a neutral position when the secondary parked, or delivery, mode is activated. Additionally, or alternatively, the controller 110, 210, 410, 510, 610 may change (or assist in changing) the steering wheel 810 between an operative (e.g., driving) state depicted in FIG. 8b (in which the driver is able to control wheels of the vehicle 10 with the steering wheel 810) and an egress assisting state, such as depicted in FIG. 8c, when the secondary parked, or delivery, mode is activated.

In the particular example shown in FIG. 8c, the steering wheel 810 has been tilted about a tilting axis 812. The tilting axis 812 may be perpendicular to a steering axis 814 about which the steering wheel 810 is rotated in the operative state. For example, the tilting axis 812 may extend in a lateral direction of the vehicle 10. When the steering wheel 810 has been tilted, e.g., as shown in FIG. 8c, it may be easier for the driver to exit the vehicle 10 as the bottom of the steering wheel 810 has moved upwards. In other examples (not shown), at least a portion of the steering wheel 810 may be moved upwards and out of the way of the driver's legs when in the egress assisting state. For example, a bottom portion of the steering wheel 810 may be moved upwards.

It is to be appreciated that a mechanism that allows movement between the operative and egress assisting states of the steering wheel 810 may be in addition to a height adjustment mechanism for the steering wheel 810 (e.g., that accommodates for different sizes of driver). Alternatively, a height adjustment mechanism for the steering wheel 810 may move the steering wheel 810 between the operative and egress assisting states.

The steering wheel assembly 800 may comprise a lock 820 that locks the steering wheel 810 in the operative state. The lock 820 may be manually released by the driver, for example, by activation of release 822. Additionally, or alternatively, the controller 110, 210, 410, 510, 610 may automatically release the lock 820 such that the steering wheel 810 can move from the operative state to the egress assisting state when the delivery mode is activated. The steering wheel 810 may be moved manually, or the steering wheel 810 may be biased into the egress assisting state such that release of the lock 820 causes the steering wheel 810 to automatically move into the egress assisting state. The steering wheel assembly 800 may be biased into the egress assisting state by virtue of a biasing element, such as a spring, and/or by virtue of gravity, e.g., by the centre of gravity of the steering wheel 810 being behind the tilting axis 812 with respect to the driver. Upon return to the vehicle, the driver may move the steering wheel 810 to the operative state and the lock 820 may automatically engage. Alternatively, the steering wheel 810 may be moved between the operative state and the egress assisting state by virtue of an actuator, and the controller 110, 210, 410, 510, 610 may activate the actuator to move the steering wheel as required.

In another arrangement, the release 822 for steering wheel lock 820 may activate the delivery mode. The release 822 may provide the user interface device 130, 230 or may be in addition to the user interface device 130, 230.

Although the features described above have been made with reference to a delivery mode, it will be appreciated that such features may also apply to the secondary park mode and variations thereof. For example, features of the present disclosure may apply to emergency vehicles, school buses, or other types of vehicles for which a secondary, or temporary, parked mode is desirable.

It will be appreciated by those skilled in the art that although the disclosure has been described by way of example, with reference to one or more examples, it is not limited to the disclosed examples and alternative examples may be constructed without departing from the scope of the disclosure as defined by the appended claims.

The invention claimed is:

1. A system comprising a controller programmed to:
activate a primary parked mode or a secondary parked mode for a vehicle based on at least one of activation data from a user interface device in communication with the vehicle or vehicle position data, wherein the primary parked mode specifies a first set of vehicle components and the secondary parked mode specifies a second set of vehicle components, wherein components in the first set are different than components in the second set; and
actuate the first or second set of vehicle components from an in-use state to a parked state based on the activated parked mode;
wherein the user interface device includes a primary portion and a secondary portion, and the user interface device is configured to transmit a user input indicating selection of the primary portion or the secondary portion to the controller; and
the user input from the primary portion includes an instruction to control a vehicle component, and the user input from the secondary portion includes the activation data and the instruction to control the vehicle component.

2. The system of claim 1, wherein the controller is further programmed to actuate each vehicle component in the second set of vehicle components from the parked state to the in-use state upon termination of the secondary parked mode.

3. The system of claim 1, wherein the secondary parked mode is terminated upon detection of the vehicle being unlocked.

4. The system of claim 1, wherein the secondary parked mode is terminated based on the activation data from the user interface device.

5. The system of claim 1, wherein, the parked state in the secondary parked mode for a particular vehicle component differs from the parked state in the primary parked mode.

6. The system of claim 1, wherein the controller is further programmed to activate the secondary parked mode based on the vehicle position data indicating the vehicle is within a distance of one or more predetermined destinations.

7. The system of claim 6, wherein the distance is determined based on an urbanization categorization of the predetermined destination, wherein the urbanization categorization is one of urban, suburban, or rural.

8. The system of claim 1, wherein the user interface device is configured to transmit a user input, including the activation data, to the controller.

9. The system of claim 8, wherein the user input further includes an instruction to control a vehicle component.

10. The system of claim 1, wherein the user interface device is separable from the vehicle.

11. The system of claim 10, wherein the user interface device is a wearable device.

12. The system of claim 1, wherein the user interface device is permanently attached within the vehicle.

13. The system of claim 1, wherein the controller is further programmed to activate the secondary parked mode on one side of the vehicle based on a first user input to the user interface device and to activate the secondary parked mode on the other side of the vehicle based on a second user input to the user interface device.

14. The system of claim 1, wherein the controller is further programmed to receive data indicating user interactions with vehicle components in the parked state.

15. The system of claim 1, wherein the controller is further programmed to receive the set of vehicle components for the secondary parked mode from a user input.

16. The system of claim 1, wherein the controller is further programmed to receive the parked state of each vehicle component specified by the secondary parked mode from a user input.

17. The system of claim 1, wherein the set of vehicle components specified by the secondary parked mode includes a steering wheel.

* * * * *